United States Patent
Basara

(10) Patent No.: US 7,264,132 B2
(45) Date of Patent: *Sep. 4, 2007

(54) BOX-LIKE CONTAINER WITH AN INTERPENETRATING STRUCTURE AND PROCESS FOR THE REALIZATION THEREOF

(75) Inventor: Michael Basara, Milan (IT)

(73) Assignee: Immanuel Industrial Co., Ltd., Tainan (TW)

(*) Notice: Subject to any disclaimer, the term of this patent is extended or adjusted under 35 U.S.C. 154(b) by 194 days.

This patent is subject to a terminal disclaimer.

(21) Appl. No.: 10/888,020

(22) Filed: Jul. 12, 2004

(65) Prior Publication Data

US 2004/0251261 A1    Dec. 16, 2004

Related U.S. Application Data

(60) Continuation of application No. 10/057,958, filed on Jan. 29, 2002, now abandoned, which is a division of application No. 09/468,836, filed on Dec. 22, 1999, now Pat. No. 6,349,841, which is a continuation-in-part of application No. 09/324,173, filed on Jun. 3, 1999, now abandoned.

(51) Int. Cl.
*B65D 1/40* (2006.01)
*B65D 6/14* (2006.01)
*B65D 8/16* (2006.01)
*B65D 1/10* (2006.01)
*B65D 1/12* (2006.01)
*B65D 1/02* (2006.01)

(52) U.S. Cl. ............................ 220/62.12; 220/62.13; 220/62.14; 220/62.15; 220/62.22; 215/12.1

(58) Field of Classification Search .. 220/62.12–62.17, 220/62.22, 23.87; 215/12.1
See application file for complete search history.

(56) References Cited

U.S. PATENT DOCUMENTS

| | | |
|---|---|---|
| 731,254 A | 6/1903 | Whitman |
| 2,033,855 A | 3/1936 | Sloan |
| 2,333,059 A | 10/1943 | Tucker |
| 2,510,091 A | 6/1950 | Dofsen |
| 2,544,140 A | 3/1951 | Dofsen |
| 2,663,910 A | 12/1953 | Danielson et al. |
| 2,689,424 A | 9/1954 | Clagett |
| 2,955,371 A | 10/1960 | Brunner |
| 3,031,722 A | 5/1962 | Gits |
| 3,086,245 A | 4/1963 | Gits |

(Continued)

FOREIGN PATENT DOCUMENTS

DE    567388    1/1933

(Continued)

*Primary Examiner*—Anthony D. Stashick
*Assistant Examiner*—Niki M. Eloshway
(74) *Attorney, Agent, or Firm*—Millen, White, Zelano & Branigan, P.C.

(57) ABSTRACT

A box-like hollow body, particularly a container of various shapes and size, comprising at least an inner hollow body 3 and an outer hollow body 2, interpenetrating with each other so as to create an integral structure with particular characteristics of mechanical resistance and ornamental, and provided with a continuous inner surface without gaps and an outer surface patterned according to zones or sections.

20 Claims, 4 Drawing Sheets

U.S. PATENT DOCUMENTS

Figure 1:
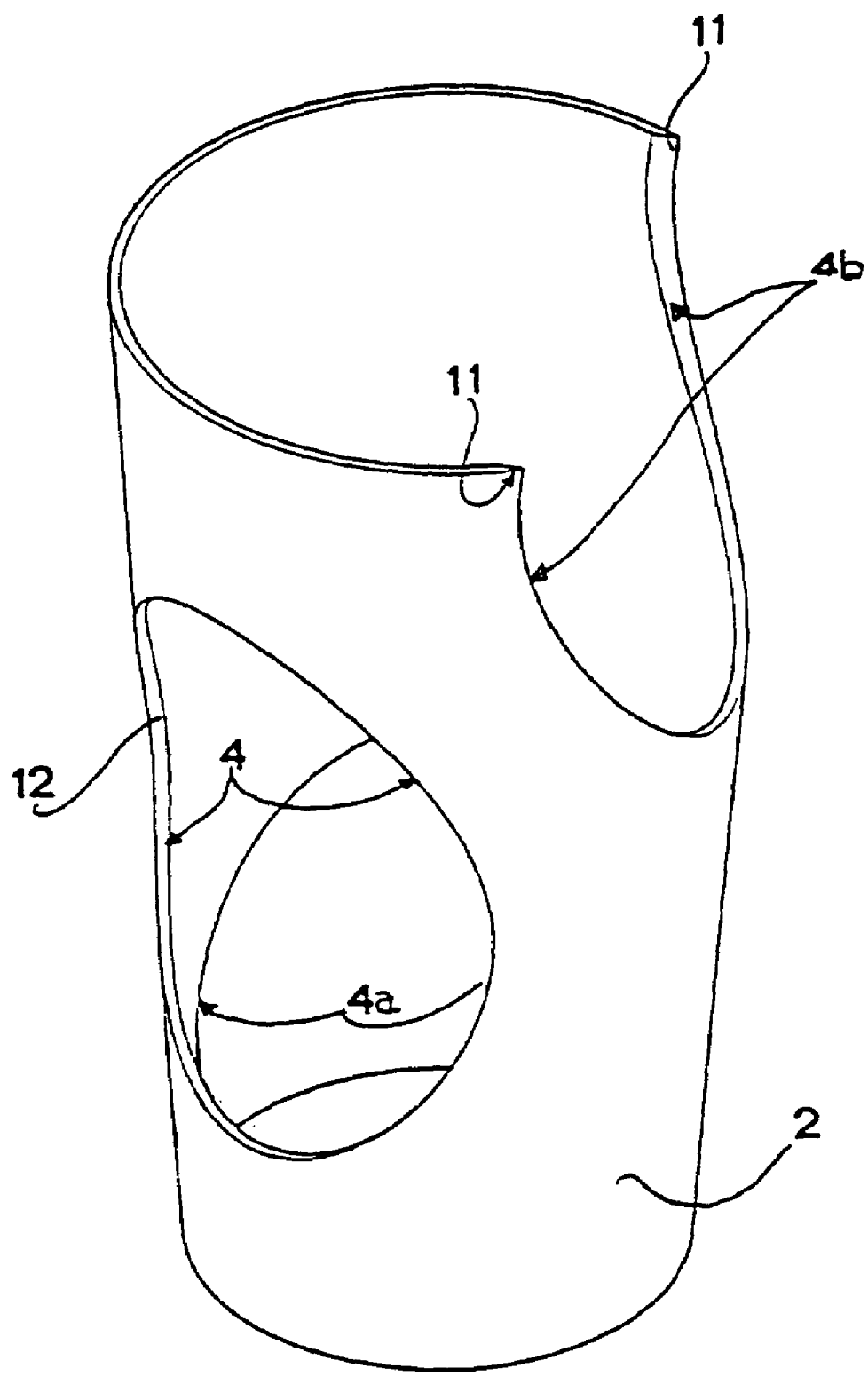

| | | |
|---|---|---|
| 3,086,250 A | 4/1963 | Gits |
| 3,108,707 A * | 10/1963 | Kend .......................... 206/457 |
| 3,354,249 A | 11/1967 | Morin |
| 3,515,262 A | 6/1970 | Ornstein et al. |
| 3,543,338 A | 12/1970 | Cooper |
| 4,155,972 A | 5/1979 | Hauser et al. |
| 4,363,240 A * | 12/1982 | Mizusaki ..................... 73/334 |
| 4,440,820 A | 4/1984 | Shiho et al. |
| 4,460,534 A | 7/1984 | Boehm et al. |
| 4,568,597 A | 2/1986 | Williams |
| 4,573,596 A | 3/1986 | Slat |
| 4,828,901 A | 5/1989 | Wank et al. |
| 4,837,892 A | 6/1989 | Lo |
| 5,261,665 A | 11/1993 | Downey |
| 5,275,277 A * | 1/1994 | Gallegos ..................... 206/217 |
| 5,290,063 A | 3/1994 | Lenhart |
| 5,308,570 A | 5/1994 | Hara et al. |
| 5,464,107 A | 11/1995 | Koeinger |
| 5,762,230 A * | 6/1998 | Policappelli ............. 220/62.12 |
| 5,810,195 A * | 9/1998 | Sim ........................... 220/674 |
| D422,179 S * | 4/2000 | Stephenson ................. D7/510 |
| 6,270,868 B1 | 8/2001 | Matsui |
| 6,349,841 B1 | 2/2002 | Basara |

FOREIGN PATENT DOCUMENTS

| | | |
|---|---|---|
| EP | 363557 | 4/1990 |
| FR | 1231866 | 10/1960 |
| FR | 1303493 | 1/1963 |
| FR | 2315246 | 1/1977 |
| FR | 2340193 | 9/1977 |
| GB | 5626 | 5/1885 |
| GB | 1503039 | 3/1978 |
| IT | 317786 | 5/1937 |

* cited by examiner

BOX-LIKE CONTAINER WITH AN INTERPENETRATING STRUCTURE AND PROCESS FOR THE REALIZATION THEREOF

This application is a continuation of Ser. No. 10/057,958 filed Jan. 29, 2002, now abandoned, which is a divisional of Ser. No. 09/468,836 filed Dec. 22, 1999, now U.S. Pat. No. 6,349,841, which is a continuation-in-part of Ser. No. 09/324,173, filed Jun. 3, 1999, now abandoned, the entire content of which is hereby incorporated by reference.

DESCRIPTION

The present invention relates to a box-like hollow body, particularly a container of various shapes and size, comprising at least an inner hollow body and an outer hollow body interpenetrating with each other so as to create a structure with particular characteristics of mechanical resistance and ornamental, and provided with a continuous inner surface without gaps and an outer surface patterned according to zones or sections.

The present invention further relates to a process for the realization of said hollow body.

Containers or box-like bodies, in particular containers such as glasses, soup-tureens, jugs, boxes for alimentary products and the like are known that have a double wall and a decoration visible on the surface.

Such box-like bodies are generally constituted by an inner body on whose outer surface a decoration or a pattern is obtained and by an outer body from transparent material which coats and covers the inner body and which is obtained by casting or injection on or about the inner body. As the external body is realized from transparent material, the decoration or the pattern obtained on the external wall of the inner body is visible in transparency through the thickness of the external body.

To realize such box-like hollow bodies, like plastic material cups or the like, according to the known art, a first shell or hollow body is prepared, for instance by injection. Then, on such first shell a second shell is also realized by injection on the outside or in the inside of the first shell, said second shell being caused to adhere to the wall of the first shell; or, the two shells are prepared separately, so that one of them is exactly contained in the other one, and so molded as to cause the two shells to adhere to one another.

Said known containers have the disadvantage that they are substantially constituted by two containers located one inside the other and that the more external container is made from a transparent material.

Besides, in case of knock or fall of the container, the two bodies tend to detach from one another.

Object of this invention is to provide a box-like hollow body, in particular a container of various shapes and size, provided with an outer surface with variously decorated or colored zones or sectors, perfectly matching with each other and affording an agreeable and original visual effect.

A further object of the invention is to provide a box-like hollow body, made in particular from plastic material, comprising at least two hollow bodies intimately associated to each other, in such a way as not to be detachable from each other because of knocks or other stresses.

These and still other objects and the related advantages that will be made apparent from the following description are achieved by a box-like body, particularly a container of various shapes and size, such as a cup, jar, box, glass, jug and the like, which container, according to the present invention, comprises at least a first outer hollow body and a second inner hollow body, interpenetrating with each other so as to form an integral structure provided with a continuous inner surface without any gaps, and an outer surface with zones or sectors constituted by portions of said second inner hollow body emerging on the surface of said first outer hollow body in such a way as to form a substantially continuous, variously decorated outer surface.

More particularly, said first outer hollow body is provided with apertures such as holes, windows, cutting and the like, variously located and having various shapes and size, and said second inner hollow body is realized in the inside of said first outer body and is provided with a continuous inner surface, i.e. without any penetration of the material of the first outer hollow body through the inner body, and an outer surface having raised portions with shape, size and thickness corresponding to the shape, size and thickness of said apertures, said raised portions being realized within said apertures and peripherally exactly and intimately matching the edge of said apertures.

Besides, the edges of said apertures obtained in said first outer hollow body are preferably realized at an acute angle, so as to ensure a still better interpenetration and coupling stability between said apertures and said raised portions of said second inner hollow body.

The box-like hollow body according to the present invention may be realized from different materials such as, for instance, plastic materials or glass. In particular, any material may be used that is suitable to change its physical state from a flowing fluid during the working step to a solid in the finished product.

Advantageously, a process for the realization of said box-like hollow body comprises the following steps:

realization of said first outer hollow body provided with said apertures by casting or injection of a first material into a suitable mold having the selected shape, casting or injection of a second material, compatible with said first material, into the inside of said first outer hollow body placed in a suitable mold, so that said second material forms said second inner hollow body, filling said apertures and realizing said continuous inner surface and forming an integral structure with said first hollow body.

Figure 2:
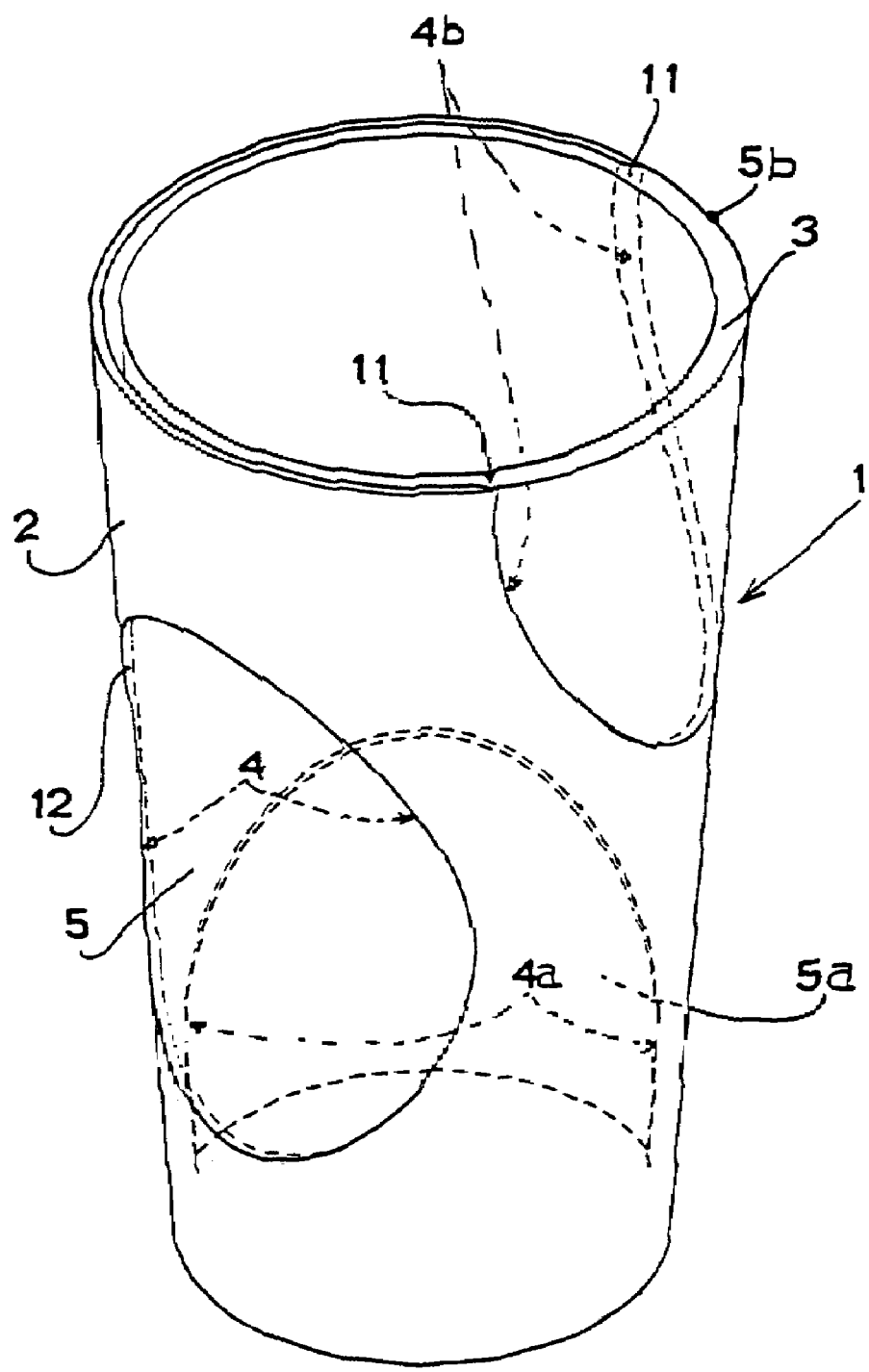
Figure 3:
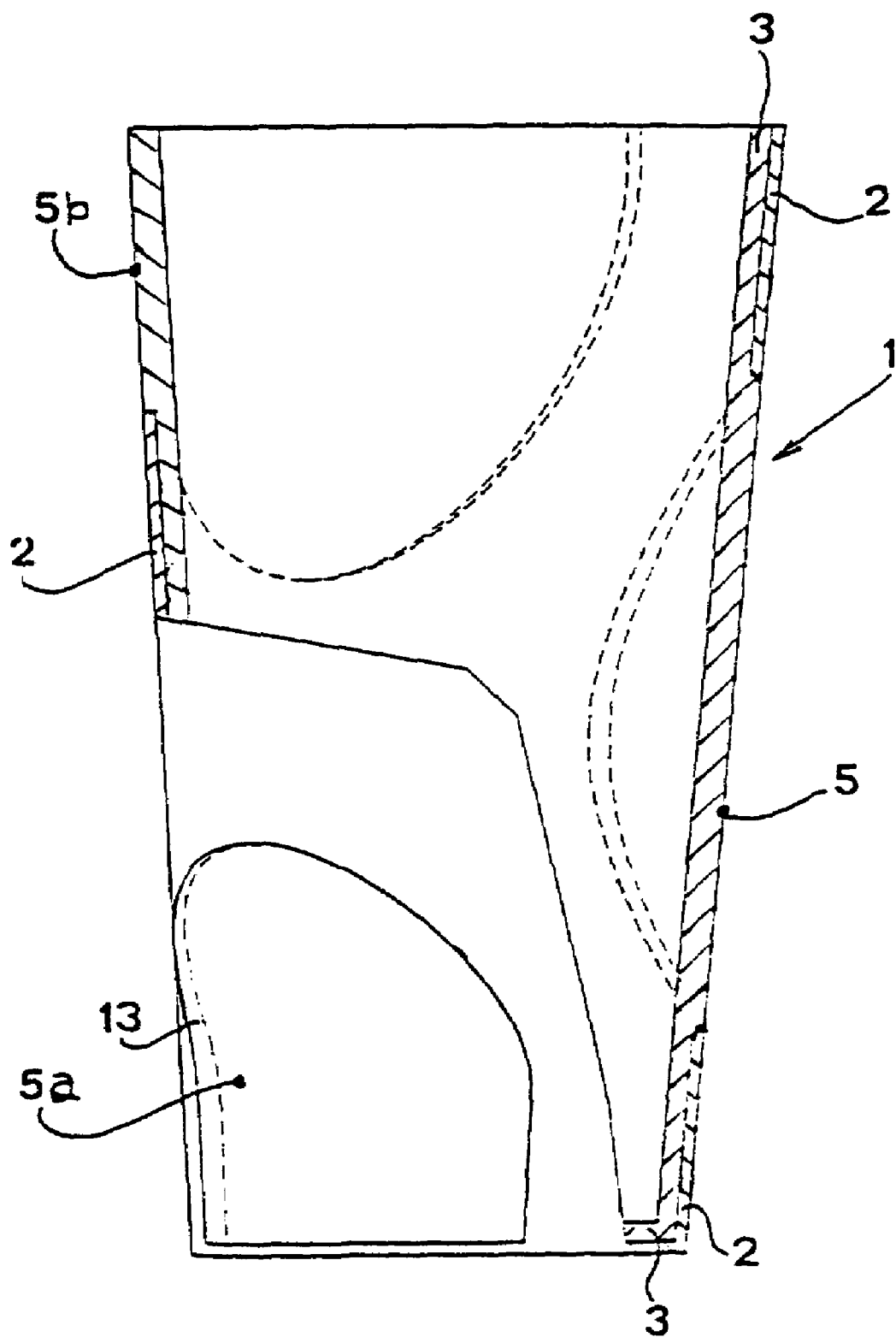
Figure 4:
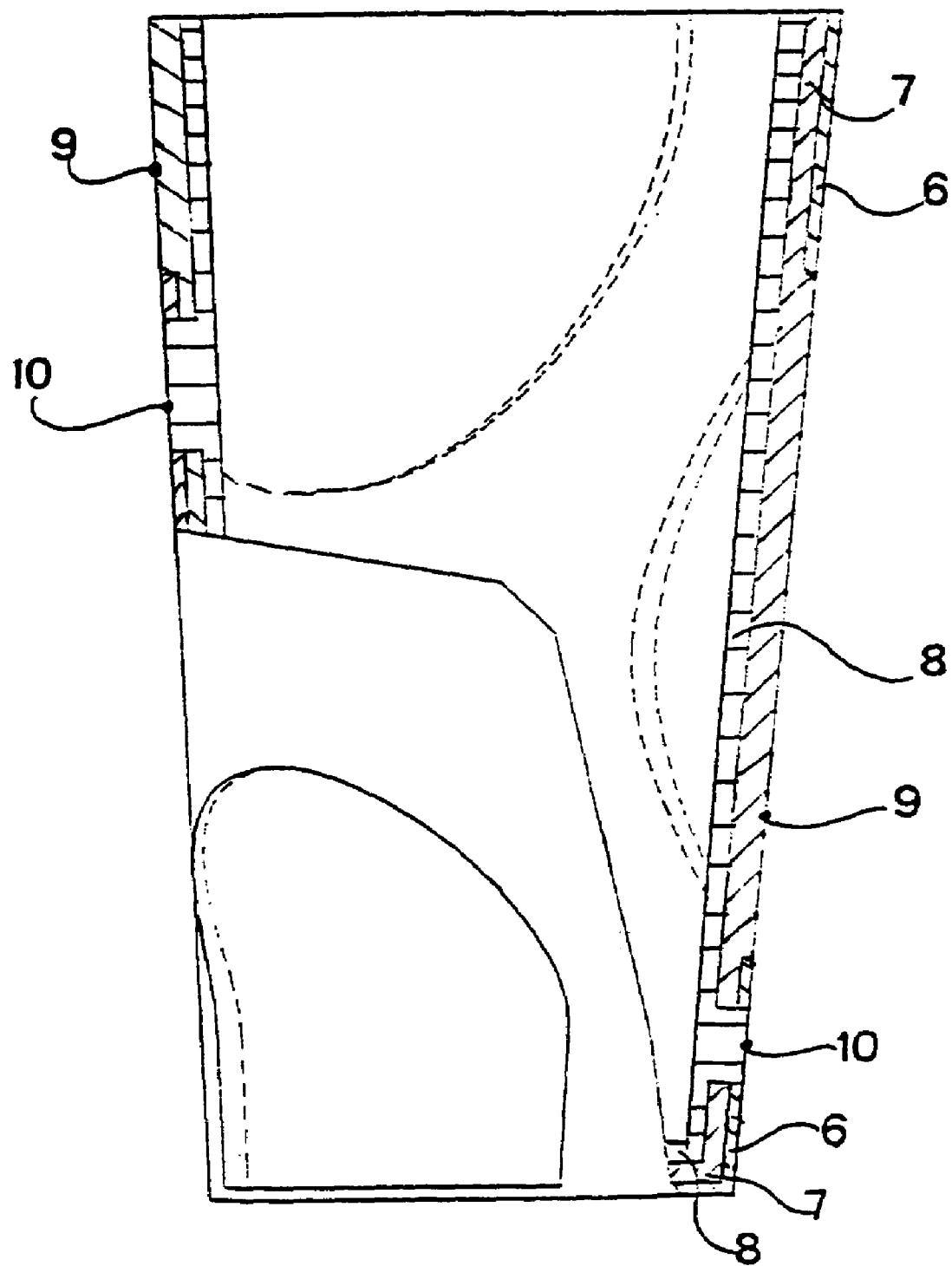

The invention is described hereafter with reference to the attached drawings, reported by way of non limiting illustration of the invention, wherein:

FIG. 1 shows a schematic perspective view of the first hollow body,

FIG. 2 schematically shows the box-like hollow body according to the invention, comprising the first hollow body and the second hollow body, FIG. 3 schematically shows a section of the box-like hollow body of FIG. 2, FIG. 4 schematically shows a section of a variant of the box-like hollow body according to the present invention.

With reference to such figures, the box-like hollow body 1 according to the invention comprises a first outer hollow body 2 and a second inner hollow body 3. The first hollow body 2 is provided with apertures constituted by windows 4 and 4a and by cutting 4b, within which apertures are respectively housed the raised portions 5, 5a and 5b of the second inner hollow body 3.

The edges 11, 12, 13 of the apertures obtained in said first outer hollow body 2 are realized at an acute angle. This realization is possible thanks to the process according to the present invention, and is very advantageous as it ensures a perfect and indissoluble coupling between the first body and the second body.

According to a variant of the present invention, said box-like hollow body; comprises a first outer hollow body 6, a second intermediate hollow body 7 and a third inner hollow body 8.

In this way it is possible to realize an outer surface of the box-like body constituted by zones divided by the emerging on the surface of the outer hollow body 6 of the raised portions 9 of the intermediate hollow body 7 and the raised portions 10 of the inner hollow body 8, obtaining in this way special aesthetic effects.

The invention claimed is:

1. A hollow container comprising at least a first discrete outer hollow body and a second discrete inner hollow body interpenetrating with the first outer body to form an integral container structure, the outer and inner bodies being formed of first and second materials, respectively, the integral container structure having a continuous inner surface without any gap and an external surface patterned in zones or sections comprising portions of the second inner hollow body penetrating and emerging through openings in the first outer hollow body to form a substantially continuous variously decorated outer surface, the openings being variously located along the outer hollow body and having various shapes and sizes, the second inner hollow body being formed along the inside of the first outer body and including a continuous inner surface formed solely of the second material and without any penetration of the first material though the inner body, the second inner body including an outer surface having raised portions in shapes, sizes and thicknesses corresponding to the shapes, sizes and thicknesses of the openings in said first outer hollow body, the raised portions being formed within the openings and peripherally exactly and intimately matching the edges of the openings to form with the outer body a smooth substantially continuous outer surface along the container structure formed of the first and second materials of the outer and inner bodies, respectively, the edges of the openings in the first outer hollow body at the substantially continuous variously decorated outer surface of the hollow container form an acute angle, and the edges of the portions of the second inner hollow body penetrating and emerging through the openings in the first outer hollow body at the substantially continuous variously decorated outer surface of the hollow container form an obtuse angle.

2. A container according to claim 1, wherein the material making up the outer hollow body is capable of changing its physical state from a flowing fluid during fabrication of the container body to a solid.

3. A container according to claim 1, wherein the material making up the inner hollow body is capable of changing its physical state from a flowing fluid during fabrication of the container body to a solid.

4. A hollow container according to claim 1, which is a box, box for containing an alimentary product soup tureen, cup, jar, glass, or jug.

5. A process for preparing a hollow container according to claim 1, comprising preparing the outer body by casting or injecting the first material into a mold, then casting or injecting the second material into the outer body in a mold to form the container.

6. A hollow container according to claim 1, wherein the inner and outer bodies are each independently made of glass or plastic.

7. A hollow container according to claim 1, wherein the first hollow body is made of a material which is capable of being provided with apertures.

8. A hollow container according to claim 1, further comprising a third discrete hollow body between the first hollow body and the second hollow body to form an integral container structure.

9. A hollow container according to claim 1, which is a soup tureen, cup, jar, glass, or jug.

10. A hollow container according to claim 1, which is a soup tureen, cup or jug.

11. A hollow container according to claim 1, which comprise three zones or sections comprising portions of the second inner hollow body penetrating and emerging through openings in the first outer hollow body.

12. A hollow container comprising a first outer hollow body and a second inner hollow body, which together form an integral hollow container, the inner body having an inner surface that is continuous and is without any penetration by the outer body, and having an outer surface having raised portions, the outer body having openings that correspond in shape and size to the raised portions of the outer surface of the inner body such that once the container is formed, the outer surface of the outer body is substantially smooth and continuous as the raised portions of the outer surface of the inner body precisely fill the openings of the outer body, wherein the openings in the first outer hollow body at the outer surface of the hollow container form an acute angle, and the edges of the raised portions of the outer surface of the inner body at the outer surface of the hollow container form an obtuse angle.

13. A hollow container according to claim 12, which is a box, box for containing an alimentary product, soup tureen, cup, jar, glass, or jug.

14. A hollow container according to claim 12, wherein the inner and outer bodies are each independently made of glass or plastic.

15. A process for preparing a hollow container according to claim 12, comprising preparing the outer body by casting or injecting the first material into a mold, then casting or injecting the second material into the outer body in a mold to form the container.

16. A hollow container according to claim 12, wherein the first hollow body is made of a material which is capable of being provided with apertures.

17. A hollow container according to claim 12, further comprising a third discrete hollow body between the first hollow body and the second hollow body to form an integral container structure.

18. A hollow container according to claim 12, which is a soup tureen, cup, jar, glass, or jug.

19. A hollow container according to claim 12, which is a soup tureen, cup, or jug.

20. A hollow container according to claim 12, which comprise three zones or sections comprising portions of the second inner hollow body penetrating and emerging through openings in the first outer hollow body.

* * * * *

UNITED STATES PATENT AND TRADEMARK OFFICE
CERTIFICATE OF CORRECTION

PATENT NO. : 7,264,132 B2 Page 1 of 1
APPLICATION NO. : 10/888020
DATED : September 4, 2007
INVENTOR(S) : Michael Basara It is certified that error appears in the above-identified patent and that said Letters Patent is hereby corrected as shown below:

Column 3, line 57, reads "alimentary product soup tureen," should read -- alimentary product, soup tureen, --

Signed and Sealed this

Seventeenth Day of June, 2008

JON W. DUDAS
*Director of the United States Patent and Trademark Office*